United States Patent
Motegi et al.

(10) Patent No.: US 9,808,984 B2
(45) Date of Patent: Nov. 7, 2017

(54) IN-MOLD LABELED CONTAINER AND MOLDING PROCESS THEREOF

(71) Applicants: Takayuki Motegi, Tochigi (JP); Shinichi Ishiyama, Tochigi (JP); Takao Kurosawa, Tokyo (JP); Yasuyuki Shimizu, Toyko (JP)

(72) Inventors: Takayuki Motegi, Tochigi (JP); Shinichi Ishiyama, Tochigi (JP); Takao Kurosawa, Tokyo (JP); Yasuyuki Shimizu, Toyko (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 193 days.

(21) Appl. No.: 14/713,646

(22) Filed: May 15, 2015

(65) Prior Publication Data

US 2015/0328820 A1   Nov. 19, 2015

Related U.S. Application Data (62) Division of application No. 11/989,613, filed as application No. PCT/JP2006/312235 on Jun. 19, 2006, now abandoned.

(30) Foreign Application Priority Data

Jul. 29, 2005   (JP) ................................. 2005-221841

(51) Int. Cl.
*B29C 49/24* (2006.01)
*B29C 49/00* (2006.01)
(Continued)

(52) U.S. Cl.
CPC .......... *B29C 49/24* (2013.01); *B29C 49/0078* (2013.01); *B29C 49/2408* (2013.01);
(Continued)

(58) Field of Classification Search
None
See application file for complete search history.

(56) References Cited

U.S. PATENT DOCUMENTS

| | | | |
|---|---|---|---|
| 3,785,311 A | 1/1974 | Yoshikawa | |
| 4,397,625 A * | 8/1983 | Hellmer | B29C 49/2408 264/509 |

(Continued)

FOREIGN PATENT DOCUMENTS

| | | |
|---|---|---|
| JP | 2003-160118 A | 6/2003 |
| JP | 2006-064029 A | 3/2006 |

OTHER PUBLICATIONS

Aug. 26, 2011 Office Action issued in U.S. Appl. No. 11/989,613.
(Continued)

*Primary Examiner* — Monica Huson
(74) *Attorney, Agent, or Firm* — Oliff PLC (57) ABSTRACT

The objects of this invention are to set a predetermined height position for the portion of parison or preform that is the first to come in contact with body molding planes of a split mold and to prevent air from being trapped between in-mold labels and the container which is blow molded from the parison or the preform. In-mold labels are fixed to the entire outer surface of body of main container. An annular thinnest wall portion is formed in the wall of the body so that the thinnest wall portion is the first to come in contact with the body molding planes of a split mold. Under this construction, no bulge of air is formed between the body and the in-mold labels fixed to the entire surface of the body.

3 Claims, 9 Drawing Sheets

(51) Int. Cl.
  B29C 49/48 (2006.01)
  B65D 23/08 (2006.01)
  B29L 31/00 (2006.01)
  B29K 101/00 (2006.01)
  B29K 105/00 (2006.01)
  B29C 49/04 (2006.01)
  B29C 49/06 (2006.01)

(52) U.S. Cl.
  CPC ...... B29C 49/4817 (2013.01); B65D 23/0864 (2013.01); *B29B 2911/14326* (2013.01); *B29C 49/04* (2013.01); *B29C 49/06* (2013.01); *B29C 2049/2412* (2013.01); *B29C 2049/2472* (2013.01); *B29K 2101/00* (2013.01); *B29K 2105/256* (2013.01); *B29L 2031/712* (2013.01)

(56) References Cited

U.S. PATENT DOCUMENTS

| | | |
|---|---|---|
| 4,573,596 A | 3/1986 | Slat |
| 4,913,643 A | 4/1990 | Shinozawa et al. |
| 5,718,852 A * | 2/1998 | Campbell ............ B29C 49/42 264/40.1 |
| 5,885,515 A | 3/1999 | Hudkins |
| 5,968,443 A | 10/1999 | Robles et al. |
| 6,086,697 A | 7/2000 | Key |
| 2004/0157011 A1 | 8/2004 | Raymond et al. |

OTHER PUBLICATIONS

Feb. 1, 2012 Office Action issued in U.S. Appl. No. 11/989,613.
Jun. 19, 2013 Office Action issued in U.S. Appl. No. 11/989,613.
Nov. 26, 2013 Office Action issued in U.S. Appl. No. 11/989,613.
Mar. 20, 2014 Office Action issued in U.S. Appl. No. 11/989,613.
Sep. 17, 2014 Office Action issued in U.S. Appl. No. 11/989,613.
Mar. 4, 2015 Office Action issued in U.S. Appl. No. 11/989,613.

* cited by examiner

IN-MOLD LABELED CONTAINER AND MOLDING PROCESS THEREOF

This is a Divisional of U.S. application Ser. No. 11/989,613 filed May 7, 2009, which is a National Phase of International Application No. PCT/JP2006/312235 filed Jun. 19, 2006, which claims the benefit of Japanese Application No. 2005-221841 filed Jul. 29, 2005. The disclosure of the prior applications is hereby incorporated by reference herein in its entirety.

TECHNICAL FIELD

This invention relates to an in-mold labeled container having in-mold labels firmly fixed to an outer peripheral surface of a body in a manner extending around the body over a whole circumferential length, and to a molding process thereof,

BACKGROUND ART

As a means of applying a label bearing a decorative pattern, a product name, and/or instructions onto the surface of a blow molded synthetic resin container, there are many types of labels on which decorative patterns, product names, and/or instructions are printed, and which are glued on the body surfaces of the containers.

These labels to be applied to the containers have excellent display effects because decorative patterns, product names, and instructions can be printed favorably on the labels. Since the work of applying labels to the container body surface is a completely independent process step, there has to be an additional process of operation required for the products to be finished. Moreover, these labels inevitably create slight unevenness or a step between the body surface and label edges, and this step may have negative effects on the container appearance and the feel of touch. In addition, with a trend toward thin wall of the container body, there were discontent and inconvenience concerning labels because it becomes more and more difficult to apply labels firmly and stably to thin body wall.

As a means of alleviating the discontent and overcoming the inconvenience, use is made of in-mold labels which are fixed to the surface of the container body at the same time as the parison is blow molded into a container.

This in-mold labeling means achieves the following effects: Firstly, no independent fixing operation is required because the in-mold labels are fixed to the container just when the parison is blow molded into the container. Secondly, there is no step between the body surface and the in-mold labels, and thus, there is no possibility that the step may ruin the appearance and the feel of touch. Thirdly, regardless of thin wall of the container, the in-mold labels can be fixed to the container firmly and stably.

Since the in-mold labels can be fixed to the container firmly and stably, it is possible for the labels to be clad over the entire surface of the container body, and thereby to have a favorably wide labeling space. In certain cases, the in-mold labels reinforce the container body mechanically and effectively. In addition, the in-mold labels are given a light blocking effect or an oxygen barrier property so that the container can block the light or does not allow oxygen to pass through the body wall.

[Patent Document 1] Japanese application No. 2006-064029

DISCLOSURE OF THE INVENTION

Problems to be Solved by the Invention

However, as the in-mold labels became larger and larger and clad over the entire body surface of the container, there has arisen a problem in the above-described technology. With an exception of the in-mold labels made of cardboard and having air permeability, there occurred air trapping between the container and the large-size in-mold label. Such trapped air inhibited firm fixing of the labels to the container, and bulges of trapped air gave damage to the appearance of the container.

Especially in the cases where the in-mold labels are clad around, and fixed to, the entire outer surface of the container body, the air existing between the in-mold label and the widening and extending parison or preform tends to escape in the circumferential direction and to cause air trapping to occur.

This invention has been made to solve the above-described problems found in conventional art. The technical problem of this invention is that, when the parison or the preform is blow molded into the container of this invention, a roughly constant, predetermined height position is set for the portion of parison or preform that is the first to come in contact with the body molding plane of the clamped split mold where the in-mold labels are held in place. The object of this invention is to prevent air from being trapped between the in-mold labels and the container which has been blow molded from the parison or the preform.

Means of Solving the Problems

The means of carrying out the invention to solve the above-described technical problems is that the blow molded container is provided with an annular thinnest wall portion which is formed at the middle height of the body and has an inner peripheral body surface with wall thickness thereof gradually growing thick toward upper and lower ends of the body, starting from the thinnest wall portion, and that in-mold labels are fixed to an outer peripheral surface of the body of the main container in a manner extending around the body over the whole circumferential length, when the container is blow molded from parison.

When the thinnest wall portion comes in contact with the body molding plane in earlier times, there may be a time lag of contact, depending on the positions of the thinnest wall portion along the circumference. In those positions, contact may be somewhat delayed. In the invention, trapped air in those positions opposed to the thinnest wall portion, where contact is delayed, can escape smoothly and spontaneously in the upward or downward direction, and no bulge of trapped air is formed. This is because, even if the contact is delayed, the thinnest wall portion is always the first portion of the body that comes in contact with the body molding planes.

Since the thinnest wall portion is disposed around the body at its middle height, this height position can be precisely determined according to that of the in-molds label held on the body molding planes of the split mold.

For the wall portions of the body other than the thinnest wall portion, contact come later, starting from the areas closest to the thinnest portion and spreading to remote areas. Thus, the bulges of air trapped between these other portions and the body molding planes are pushed out, one by one, by the behavior of these other portions steadily and spontaneously in the upward or downward direction.

The invention comprises that, the in-mold labels are a combination of two labels, each having a length a half as much as the circumferential length of the body.

In the invention, the respective length of the two labels in the circumferential direction never becomes larger than the circumferential length of the body molding plane of each split mold half. Thus, each mold half can hold a half-length in-mold label without allowing the label to extend beyond the range of the body molding plane of each mold half.

The invention comprises that, the in-mold labels are fixed to the body over an entire height range thereof except for an upper end portion connected to shoulder and a lower end portion connected to bottom.

In the invention, both of upper and lower edges of in-mold labels need not be located in the portions of the body where outer diameter is changed. Therefore, these upper and lower edges can be fixed strongly to, and held stably on, the container. These in-mold labels provide a wide range of display area from bottom to shoulder.

The invention comprises that, the in-mold labels are fixed to the body, but are disposed separately in an upper area and a lower area of the body with no labeled area in between.

In the invention, there can be different displays for the upper area and the lower area of the body.

The invention comprises that, peripheral raised ribs having a maximum outer diameter are disposed on outer peripheral surfaces of both the upper and lower ends of the body, i.e., the upper end connected to the shoulder and the lower end connected to the bottom.

In the invention, mechanical strength of the body can be increased because the peripheral raised ribs serve as reinforcing ribs. If in-mold labels are fixed to the entire height range of the body excluding these peripheral raised ribs, the upper and lower edges of each in-mold label rest at the bases of these ribs. Since the peripheral raised ribs have a maximum outer diameter, these ribs protect the in-mold labels against careless contact with other containers in cases of handling many containers packed side by side. In addition, with the help of these ribs, the in-mold labels are fixed to the container at precisely located positions of the body surface.

The invention comprises that, the in-mold labels are made of synthetic resin film belonging to the same series of resins as that of the main container itself (1).

In the invention, there is no need of handling in-mold labels separately from containers in waste disposal and recycling of containers. It is also possible to obtain strong fixation between the body and the in-mold labels.

The invention comprises that, the body has a shape of a straight cylinder.

In the invention, the body has a uniform outer diameter over the entire height range. Therefore, the thinnest wall portion of the blow molded body can be molded accurately and stably. Since the outer surface of the body is a primary curved surface, the in-mold labels can be fixed in an appropriate configuration.

The means of carrying out the invention to solve the above-described technical problems is a process for blow-molding parison into an in-mold labeled container comprising a main container having in-mold labels fixed to the outer peripheral surface of the body in a manner extending around the body over the whole circumferential length. The main container has a thinnest wall portion formed annularly at a middle height of the body and has an inner peripheral body surface with wall thickness thereof gradually growing thick toward upper and lower ends of the body, starting from the thinnest wall portion. This process comprises injection molding parison (P) so as to give a structure in which the parison (P) has an annular thin wall portion (P1) in a part of the body (4) as a result of wall thickness control, setting the thin wall portion at a position opposed to body molding planes of a split mold, with each in-mold label being held by a corresponding body molding plane, pinching the parison with both halves of the split mold, and blow molding the parison into the container.

In the invention, an easily deformable thin wall portion tends to widen and extend more quickly than other portions do because of minimum thickness, and comes in earliest contact with the body molding planes of the split mold that holds the in-mold labels in place. Then, the other portions come in contact in sequence, starting from the portions closest to the thin wall portion and spreading to remote areas.

When the thin wall portion of parison comes in contact with body molding planes in earlier times, there may be more or less a time lag of contact, depending on the positions of the thin wall portion along the circumference, and contact may happen to be somewhat delayed in these positions. However, the thin wall portion is always the first portion of the body that comes in contact with the body molding planes, as compared with the areas on the upside and downside of the thin wall portion, where contact comes later. Therefore, trapped air in those positions opposed to the thin wall portion, if any, can escape smoothly and spontaneously in the upward or downward direction, and no bulge of air is formed.

For the portions of parison other than the thin wall portion, contact with the body molding planes shifts from the area closest to the thin portion to remote areas, while pushing out bulges of air between the body wall and the body molding planes.

The invention comprises that, the parison is pinched with both halves of the split mold after the in-mold labels have been held in place at positions opposed to the thin wall portion.

In the invention, a part of each in-mold label is pushed by the thin wall portion of the parison against the body molding planes of a split mold, whereby the position of the thin wall portion is set down. Starting from this fixed position of the thin wall portion, the expanding parison continues to push other parts of the in-mold labels against the body molding planes. In this manner, the in-mold labels can stably maintain the precisely positioned contact with the body molding planes.

The invention comprises that, the in-mold labels are held in place in the split mold by vacuuming all edges of the in-mold labels in the circumferential direction.

In the invention, the in-mold labels, which are longer in the circumferential direction than in the vertical direction, are precisely positioned for all the edges, and in such a state, are maintained in contact with the body molding planes of the split mold. Therefore, the in-mold labels are held in place easily and precisely with a posture in which they are to be fixed to the blow molded body.

Effects of the Invention

This invention having the above-described construction has the following effects:

According to the invention, the body comprises a thinnest wall portion and other portions. Since the thinnest wall portion and other portions are different in the timing of contact with the body molding planes, no bulge of air is formed between the blow molded body and the in-mold labels. As a result, the in-mold labels are fixed to the body strongly and stably, and the container can maintain a good shape which has not been degraded by bulges of air.

The height position of the thinnest wall portion of the body can be accurately determined so that this portion is disposed at right positions opposed to the in-mold labels held on the body molding planes of the split mold. It is also possible to govern the behavior of the body and set the timing of contact in advance almost accurately when the body expanding in the process of blow molding pushes the in-mold labels against the body molding planes. Therefore, the in-mold labels can be fixed properly to the body.

According to the invention, the in-mold labels can be held at right positions opposed to the body molding planes of the split mold. Since the in-mold labels can be held in place by the split mold safely in high precision, the in-mold labels are fixed to the outer peripheral surface of the body in a manner extending around the body over the whole circumferential length, and this structure of labels on the body can be obtained easily and reasonably.

According to the invention, the container has a high decorative effect because almost entire outer surface of the body is clad with the in-mold labels. This decorative effect can be fulfilled when the almost entire surface of the body is used as a display area once the in-mold labels have been firmly fixed to the body. The in-mold labels covering almost entire outer surface of the body can also be utilized as a reinforcing material for the body, thus allowing containers to have thinner wall.

According to the invention, there can be different displays of in-mold labels for the upper area and the lower area of the body. This configuration gives the container large changes in the decorative displays by means of the in-mold labels. For instance, highly distinctive, individualized decorations can be displayed.

According to the invention, the peripheral raised ribs enhance mechanical strength of the body. In addition, since the in-mold labels are fixed firmly to the body, the mechanical strength of the body equipped with in-mold labels can be fully increased. These peripheral ribs are also useful to protect the decorative displays of the in-mold labels indirectly. This effect is notably achieved if the body has a straight cylindrical shape.

According to the invention, there is no need of handling in-mold labels separately from containers in waste disposal. Therefore, container handling will become quite easy in the withdrawal of used containers and the recycling of materials. Since firm fitting of the body to the in-mold labels can be readily obtained, the in-mold labeled containers of high quality are available.

According to the invention, it is possible to mold the preceding body portion with ease and precision when this portion is first molded. Since the outer surface of the body is a primary curved surface, the in-mold labels can be fixed in an appropriate configuration. Thus, favorable in-mold labeled body can be obtained in an assured way.

According to the invention, the thin wall portion of the parison is blow molded stably and steadily into the corresponding thinnest wall portion of the body, thus ensuring that the body comprising the thinnest wall portion and other portions is molded without fail.

Since the thinnest wall portion of the body can be molded without fail, the container is naturally protected from bulges of air that are formed between the body and the in-mold labels. The in-mold labeled body having high mechanical strength and good shape can be molded by utilizing the thinnest wall portion.

According to the invention, the in-mold labels held in place by the split mold are prevented from wrong displacement because the thin wall portion of the parison ensures that the in-mold labels can stably maintain the precisely positioned contact with the body molding planes of the split mold.

According to the invention, the in-mold labels can be fixed properly to the body molding planes of the split mold with ease and precision. As a result, any inconveniences, such as overlapped edges of the in-mold labels or the edges pinched between two halves of the split mold, can be safely prevented from occurring. The in-mold labeled container can be molded precisely and stably.

EXPLANATION OF CODES

1. Main container
2. Neck
3. Shoulder
4. Cylindrical body
4a. Thinnest wall portion
5. Peripheral raised rib
6. Bottom
7. In-mold label
7a. Butting edge
7b. Gap
8. Cap
9. Fitting cylinder
10. Top plate
11. Hinge
12. Lid
13. Split mold
14. Body molding plane
15. Vacuum hole
16. Nested block
17. Vacuum channel
18. Pinch-off section
19. Blow jig
P. Parison
P1. Thin wall portion

PREFERRED EMBODIMENTS OF THE INVENTION

This invention is further described with respect to preferred embodiments, now referring to the drawings.

Figure 1:
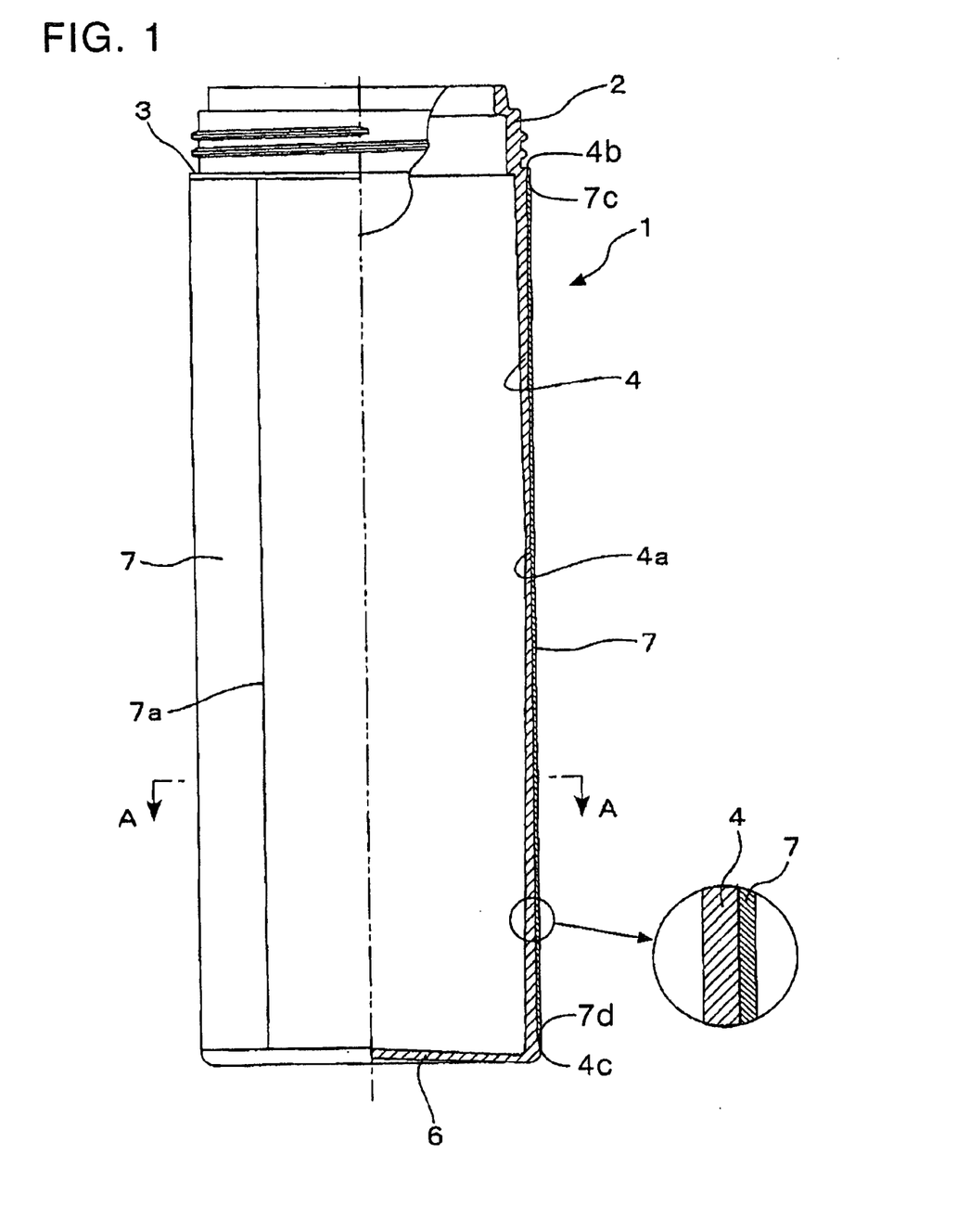
FIG. 1 is a front elevational view of the container in the first embodiment of this invention, with right half being illustrated in a vertical section.

FIG. 1 is a front elevational view of the container in the first embodiment of this invention, with the right half shown in a vertical section. This container comprises a main container 1, which is a blow molded product made of a synthetic resin, and in-mold labels 7 clad around, and fixed to, outer surface of a body 4 of the main container 1. This main container 1 comprises the cylindrical body 4 in the shape of a straight cylinder, a bottom 6 dented slightly inward in a spherical arc to close the body 4, a shoulder 3 which is an inward step from upper end of the body 4, and a cylindrical neck 2 having a diameter shorter than that of the body 4 and also having a screw thread notched around the outer surface.

In the first embodiment of this invention, the body 4 of the main container 1 is disposed between the shoulder 3 and the bottom 6, and comprises a thinnest wall portion 4a and other portions. The thinnest wall portion 4a is the first to come in contact with the body molding planes 14 of a split mold 13, which is a blow mold. For other wall portions having thicker wall, contact comes later, starting from areas closest to the thinnest wall portion 4a, and spreading to remote areas.

The in-mold labels 7 to be fixed to an outer peripheral surface of this body 4 are made of a synthetic resin film in the same series of the synthetic resin used to mold the main container 1. These labels are fixed to the body 4 over the entire height range thereof, excluding the upper end portion connected to the shoulder 3 and the lower end portion connected to the bottom 6, and also in a manner extending around the body 4 over the whole circumferential length. The in-mold labels 7 are a combination of two in-mold labels having the same height and the same peripheral length.

Figure 2:
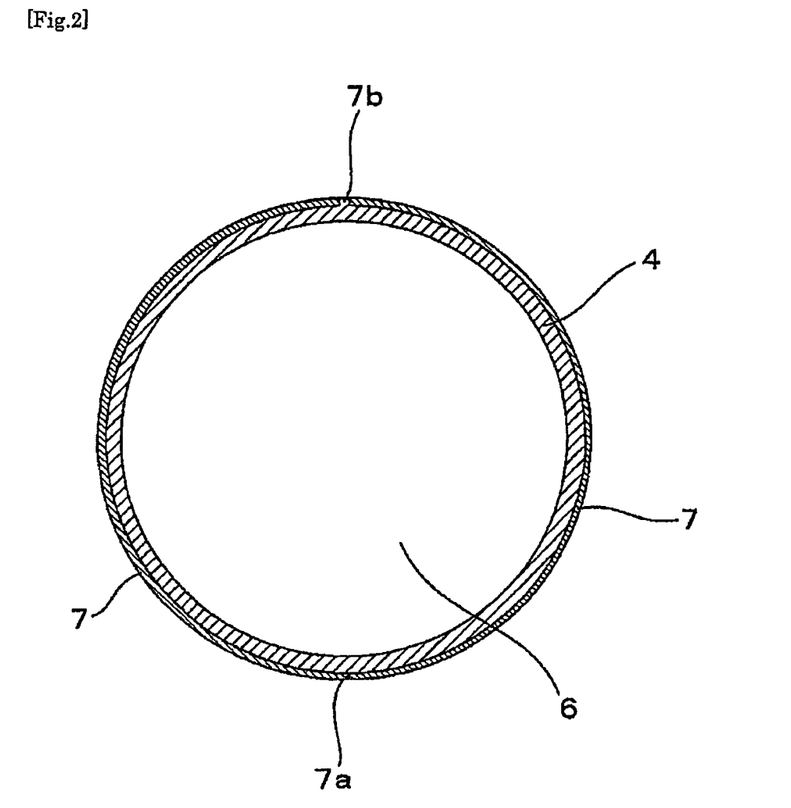
FIG. 2 is an enlarged cross-sectional plan view of the container of FIG. 1, taken from line A-A.

When the in-mold labels 7 comprising a pair of in-mold labels are fixed to the outer surface of the body 4, the two labels make an end-to-end contact at a butting edge portion 7a on one side, while on the other side, a slight gap 7b in the range of 0.5 to 1 mm is left between two vertical edges so that both edges face each other beyond this gap.

Thus, the gap 7b is prepared between two vertical edges of the two in-mold labels 7 on the other side of the connection between two in-mold labels 7. This gap serves to prevent the vertical edges from being overlapped with each other. The circumferential length of the two in-mold labels 7 is set so as to have a length shorter than the counterpart of the body molding plane 14 (See FIG. 7) of the split mold 13 by a value corresponding to a maximum level (about 0.5 mm) of metrication error that is likely to occur. Though the gap 7b may remain, it ensures that the vertical edges of the in-mold labels 7 are protected against overlapping.

If overlapping occurred between the two edges of the two in-mold labels 7 on one side of the connection, the edge portion on top of the other edge would tend to be peeled easily. Once this occurs, it is very likely that this peeling develops further until this in-mold label 7 would peel from the body 4.

As illustrated by FIG. 1, the thinnest wall portion 4a is annularly formed in a middle part of the body 4 adjacent to the in-mold labels 7 as viewed in a height direction, the body 4 has an inner peripheral body surface with a wall thickness gradually growing thick toward upper and lower ends of the body 4 starting from the thinnest wall portion 4a to positions 4b, 4c of the body 4 fixed with the in-mold labels 7 that are adjacent to the top end 7c and the bottom end 7d of the in-mold labels 7, and the outer peripheral surface of the body 4 extends along one plane such that the outer peripheral surface is flat at a position of the body 4 adjacent to the in-mold labels 7 between the top end 7c and the bottom end 7d of the in-mold labels 7.

Figure 3:
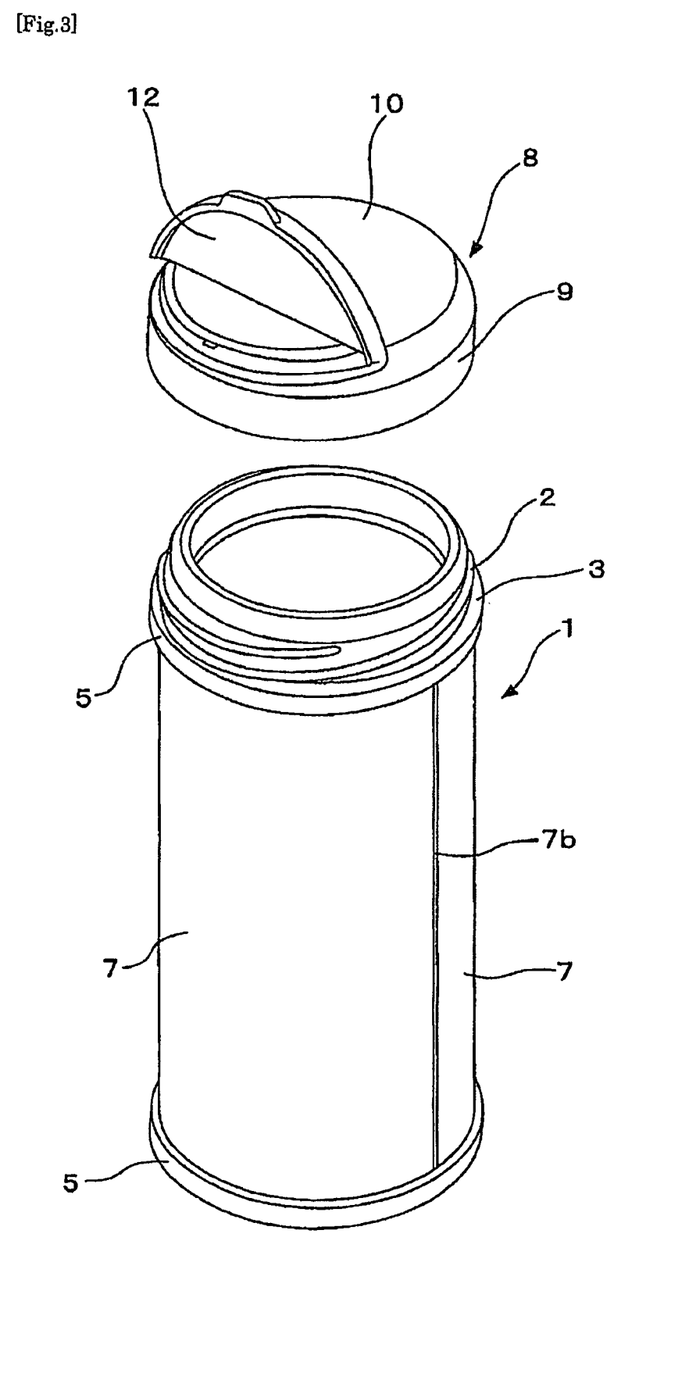
FIG. 3 is an exploded perspective view of the container in the second embodiment of this invention.
Figure 4:
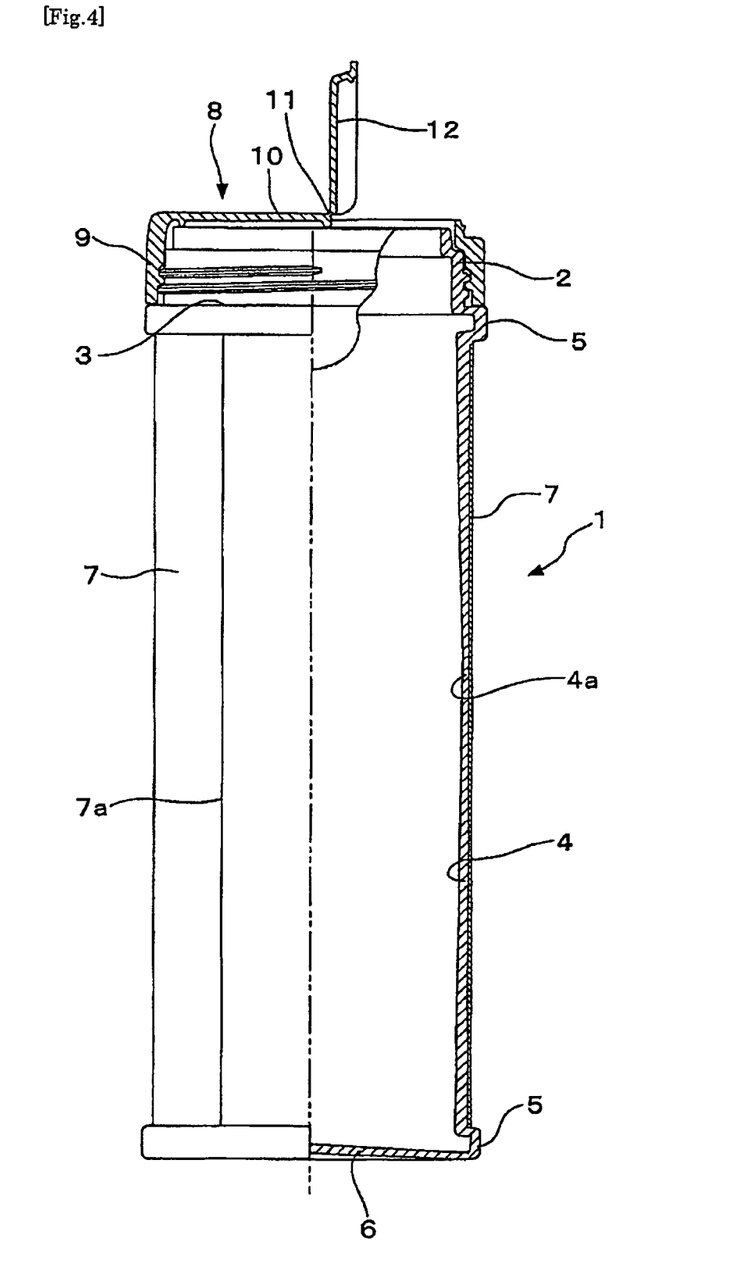
FIG. 4 is a front elevational view of the container in the second embodiment of this invention shown in FIG. 3, with right half being illustrated in a vertical section.

FIG. 3 is an exploded perspective view of the container in the second embodiment of this invention, to which a cap 8 is to be fitted so that the container can be utilized as a caster to shake the contents out of the container. As shown in FIG. 4, the main container 1 has the same construction as the first embodiment, except that portions having the largest outer diameter are disposed at upper and lower ends of the body 4 and that peripheral raised ribs are disposed in those upper and lower portions so that upper and lower edges of the in-mold labels 7 can rest at the bases of these ribs.

In this second embodiment, the container has a stable shape-retaining ability because the peripheral raised ribs 5 serve as reinforcing ribs. The peripheral raised ribs 5 have the largest outer diameter, as compared to other portions of the main container 1, and stabilize the container posture when many containers stand side by side. As a result, the containers can be handled in good conditions during storage or transportation. During the time when the containers are handled, the ribs protect the in-mold labels 7 fixed to outer surface of the body so that the labels 7 may not by accident come in contact with other containers or objects.

The cap 8 is fitted to the container in the second embodiment of this invention so that the container is utilized as a caster. This cap 8 comprises a fitting cylinder 9 which is fitted around the neck 2 by screw engagement, a top plate 10 disposed at the upper end of the fitting cylinder 9 to close roughly a half of the upper opening, and a lid 12 in a semi-circular shape, which is connected to a straight edge of the top plate 10 on the opening side of the fitting cylinder 9 by way of a hinge in a swingable manner and is provided with a skirt segment hanging from the lid 12 along its semi-circular edge.

The cap fitted to the main container 1 is not limited to the illustrated one for caster use, but any desired cap, such as an ordinary removable cap or a dischargeable cap, can be fitted.

Figure 5:
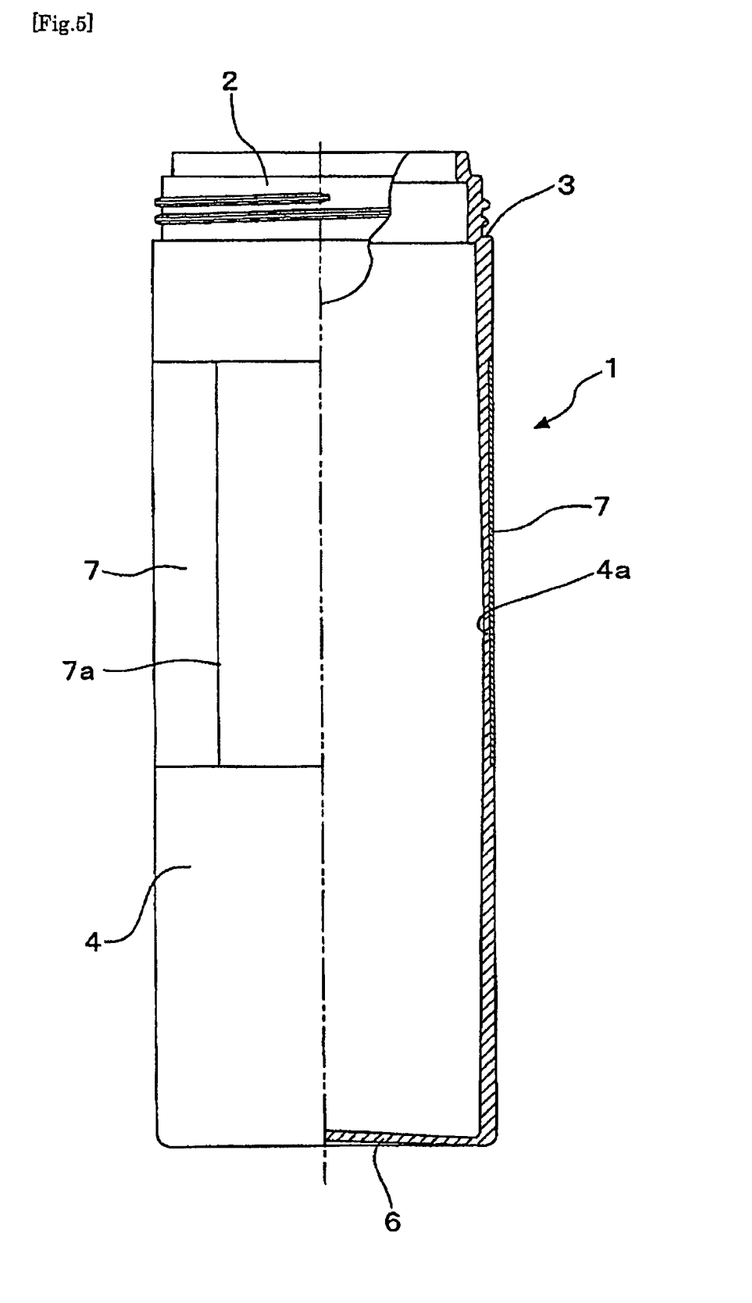
FIG. 5 is a front elevational view of the container in the third embodiment of this invention, with right half being illustrated in a vertical section.

FIG. 5 shows the container in the third embodiment of this invention. In this embodiment, the in-mold labels are fixed to only a middle area of the body, in a position somewhat closer to the shoulder than to the bottom, but are under the same construction as in the first embodiment for other portions.

In the case of the third embodiment, the thinnest wall portion 4a is in the position opposed to the in-mold labels 7. A combination of the main container 1 and the in-mold labels 7 creates a decorative effect on the container.

Figure 6:
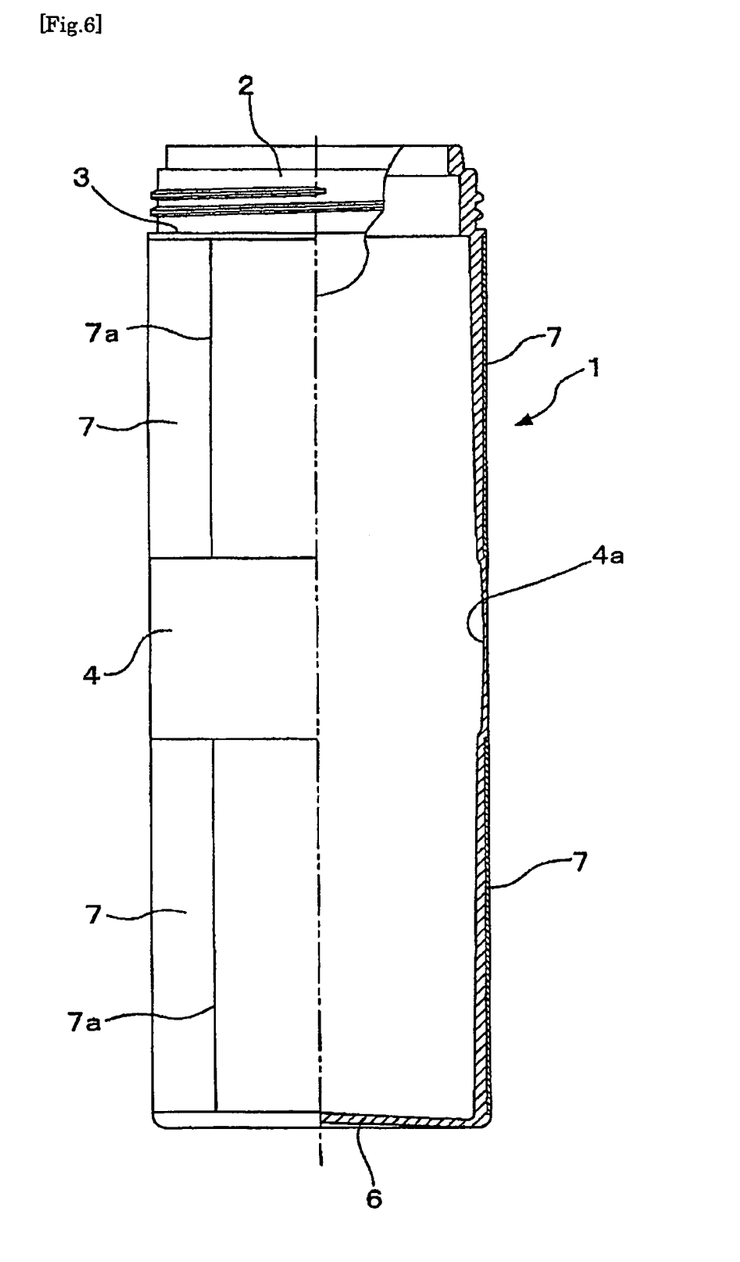
FIG. 6 is a front elevational view of the container in the fourth embodiment of this invention, with right half being illustrated in a vertical section.

FIG. 6 shows the container in the fourth embodiment of this invention, in which the in-mold labels 7 are fixed to the body 4, excluding the upper end portion connected to the shoulder 3 and the lower end portion connected to the bottom 6, but are disposed separately in an upper area and a lower area of the body 4 with no labeled area in between. Other than this configuration, the container has the same construction as the first embodiment.

In this fourth embodiment, the thinnest wall portion 4a of the body 4 is disposed in a space between a portion opposed to upper in-mold labels 7 and a portion opposed to lower in-mold labels 7. Under this construction, the behavior of parison P (See FIG. 9) in the blow molding operation would have a uniform effect on the two pairs of in-mold labels 7.

Since two pairs of upper and lower in-mold labels 7 are used to display the container, it is possible to make the container display fresh and varied.

Figure 7:
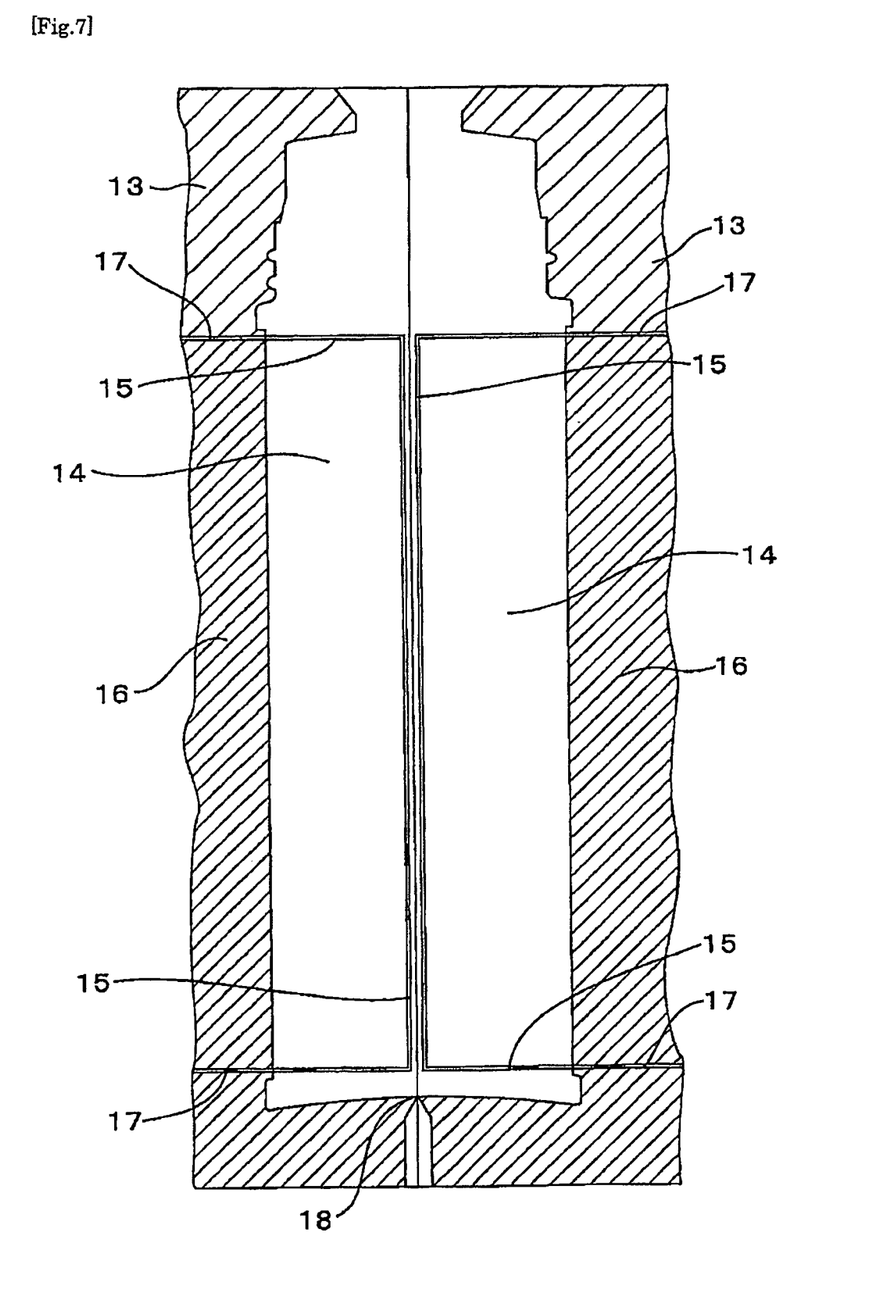
FIG. 7 is a vertical section showing an exemplified structure of the split mold for molding the container of this invention.
Figure 8:
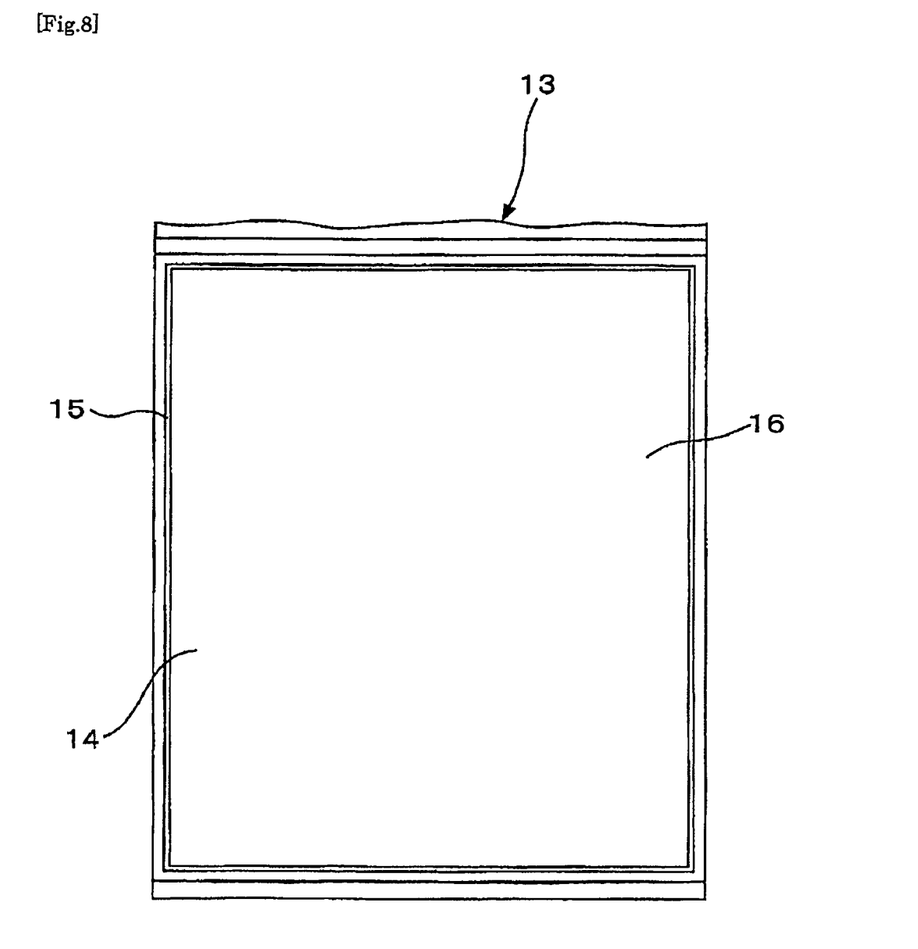
FIG. 8 is a development showing an exemplified structure of the body molding plane for use in the split mold shown in FIG. 7.

FIG. 7 is a vertical section of an important part of a pair of halves of the split mold 13 used to mold the container in the second embodiment of this invention. The split mold 13 has a pinch-off section 18 under the container cavity, and nested blocks 16 are combined with the split mold 13 and are used as the body molding planes 14. FIG. 8 is a development of a body molding plane. As shown, a slit-like endless vacuum hole 15 in a square shape is open along the four sides of each body molding plane. Vacuum channels 17 are also disposed in the split mold 13.

Under this construction, the in-mold labels 7 can be held by vacuum in tight contact with the body molding planes 14 because the in-mold labels 7 are held in place by vacuum the labels 7 along their entire circumference. Since vacuum holes 15 are formed along the vertical edges of each body molding plane, the in-mold labels 7 are naturally held in place in a precisely positioned state.

When the container is blow molded in the split mold 13 shown in FIG. 7, the in-mold labels 7 are positioned by means of a robot and the like in the open split mold 13, and are held in contact with the body molding planes 14 by vacuuming the body molding planes through the vacuum holes 15.

The parison P is extrusion molded by an extruder (not shown) and is pinched by both halves of the split mold 13. Since an annular thin wall portion P1 has been molded in a part of the parison under the wall thickness control at the time of extrusion molding, the parison P is pinched at right timing when this thin wall portion P1 has come to face a desired position of the body molding planes 14 (See the parison in solid lines in FIG. 9).

Figure 9:
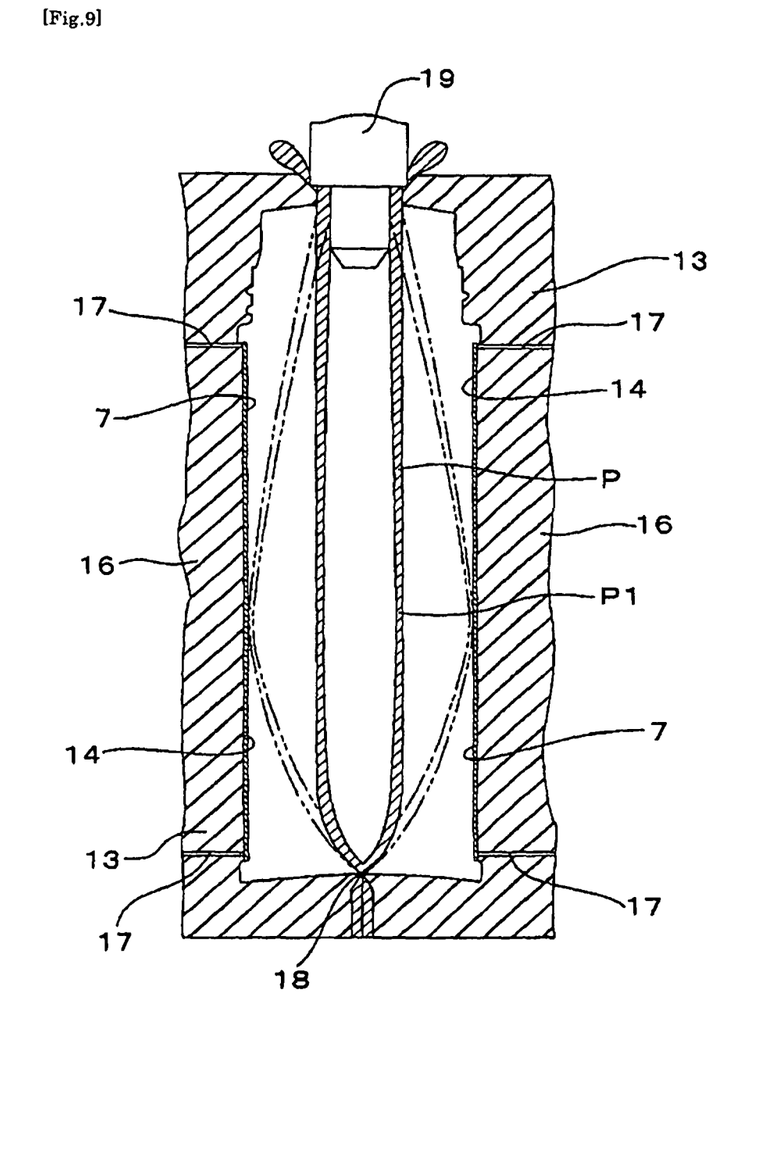
FIG. 9 is an explanatory diagram showing blow molding behavior displayed in the molding process of this invention.

After the parison P has been pinched with both halves of the split mold 13 and cut off at the pinch-off section, a blow jig 19 is fitted to the split mold 13, and the pinched parison P is blow molded into the main container 1, following an ordinary blow molding procedure.

When the parison P is blow molded into the main container 1, the thin wall portion P1 of the parison is the first to widen and expand, as shown by chain two-dashed lines, because P1 is easier to expand than the rest of the parison. Thus, the thin wall portion P1 quickly comes in contact with the in-mold labels 7 that are held in place, and is molded into the thinnest wall portion 4a of the body 4.

As the blow molding of the parison P goes on in this state, portions of the parison P, other than the thin wall portion, come in contact with the in-mold labels 7, starting from the areas closest to the thin wall portion and spreading to remote areas, and are molded into other portions of the body 4.

For the portions of the parison P that are molded into other portions of the body 4, contact with the in-mold labels 7 comes later, starting from the areas closest to the thin wall portion P1 and spreading to remote areas. Since at the time of contact, bulges of air trapped between the in-mold labels 7 and the parison P are pushed out, no bulge of air is formed between the in-mold labels 7 and the body 4 molded from the parison P.

The in-mold labels 7 can be fixed to the body 4 of the blow molded container at the same time as the blow molding of the main container 1, by a thermal adhesion means utilizing the heat of parison P or by a pressure adhesion means utilizing a blow molding pressure.

In the foregoing description of this invention, blow molding was used as an example. However, means of carrying out this invention is not limited to blow molding, but can be applied also to biaxial drawing and blow molding.

The invention claimed is:

1. A process for blow-molding an in-mold labeled container comprising a main container having in-mold labels fixed to an outer peripheral surface of a body in a manner extending around the body over a whole circumferential length, the body having a thinnest wall portion formed annularly in a middle part of the body as viewed in a height direction, the process comprising:
    a first process that comprises extrusion molding a parison so as to give the parison an annular thin-wall portion by means of wall thickness control, the parison being later blow-molded into the main container,
    a second process that comprises pinching the parison with both halves of a split mold, while setting the thin-wall portion at a position opposed to body molding planes of the split mold when the pair of halves of the split mold is clamped with each in-mold label being held by a corresponding body molding plane, and
    a third process that comprises blow molding the parison into the main container to expand and deform the thin-wall portion into the thinnest wall portion of the container, wherein the thin-wall portion first contacts with the in-mold labels during a period when the perison is being blow-molded in order to create the body that has an inner peripheral body surface with a wall thickness thereof gradually growing thick toward upper and lower ends of the body starting from the thinnest wall portion and the outer peripheral surface that extends along one plane such that the outer peripheral surface is flat.

2. The process for molding an in-mold labeled container according to claim 1 wherein the parison is pinched with both halves of the split mold after the in-mold labels have been held in place at positions opposed to the thin wall portion.

3. The process for molding an in-mold labeled container according to claim 1 wherein the in-mold labels are held in place in the split mold by vacuuming all edges of the in-mold labels in the circumferential direction.

* * * * *